(12) United States Patent
Nesburg et al.

(10) Patent No.: US 6,786,301 B2
(45) Date of Patent: Sep. 7, 2004

(54) SCAFFOLD SYSTEM

(76) Inventors: Robin Nesburg, 701 SE. First St. P.O. Box 526, Fairfax, MN (US) 55332; Roy Nesburg, 1621 W. 5$^{th}$ St., Redwing, MN (US) 55066; James Nesburg, 408 E. Chestnut, Redwood Falls, MN (US) 56283

( * ) Notice: Subject to any disclaimer, the term of this patent is extended or adjusted under 35 U.S.C. 154(b) by 0 days.

(21) Appl. No.: 10/165,622

(22) Filed: Jun. 8, 2002

(65) Prior Publication Data

US 2003/0226715 A1 Dec. 11, 2003

(51) Int. Cl.$^7$ .................................................. E04G 1/00
(52) U.S. Cl. ............................... 182/185.1; 182/186.6; 182/188
(58) Field of Search .................. 182/151, 181, 182/185.1, 186.6, 188, 224; 269/37, 98, 296

(56) References Cited

U.S. PATENT DOCUMENTS

| 1,458,738 A | * | 6/1923 | Teeken | 182/185.1 |
| 3,047,337 A | * | 7/1962 | Carver | 182/185.1 |
| 3,082,027 A | * | 3/1963 | Johnson | 182/185.1 |
| 3,632,152 A | * | 1/1972 | Renfroe | 294/85 |
| 3,924,718 A | * | 12/1975 | Kornylak | 193/35 R |
| 4,121,814 A | * | 10/1978 | Prior | 269/98 |
| 4,183,317 A | * | 1/1980 | Follick | 116/63 P |
| 5,029,670 A | * | 7/1991 | Whitmer | 182/113 |
| 5,193,598 A | * | 3/1993 | Estrem | 144/287 |
| 5,377,780 A | * | 1/1995 | Dunaway | 182/185 |
| 5,803,422 A | * | 9/1998 | Buehler | 248/339 |
| 5,865,269 A | * | 2/1999 | Eskesen | 182/182.2 |

FOREIGN PATENT DOCUMENTS

| GB | 2046825 | * | 11/1980 | 182/185.1 |
| JP | 233024 | * | 8/2002 | 182/185.1 |

* cited by examiner

Primary Examiner—Bruce A. Lev
(74) Attorney, Agent, or Firm—Angenehm Law Firm; N Paul Friederichs

(57) ABSTRACT

A scaffold system, including a plank; at least one end support having a plank bracket, the plank engaging the plank bracket, the end support having adjustable legs, and the end support having at least one cross bar interconnecting the legs; a moveable tray including a plank attachment, a vertical support and an upper horizontal support, the vertical support interconnecting the plank attachment and the upper horizontal support, the plank attachment having a hook end adapted to encase an edge of the plank; and a material support bracket including a plank securement and a material support, the plank securement releasably and slidably joined to the plank, the material support adjustably joined to the plank securement.

11 Claims, 3 Drawing Sheets

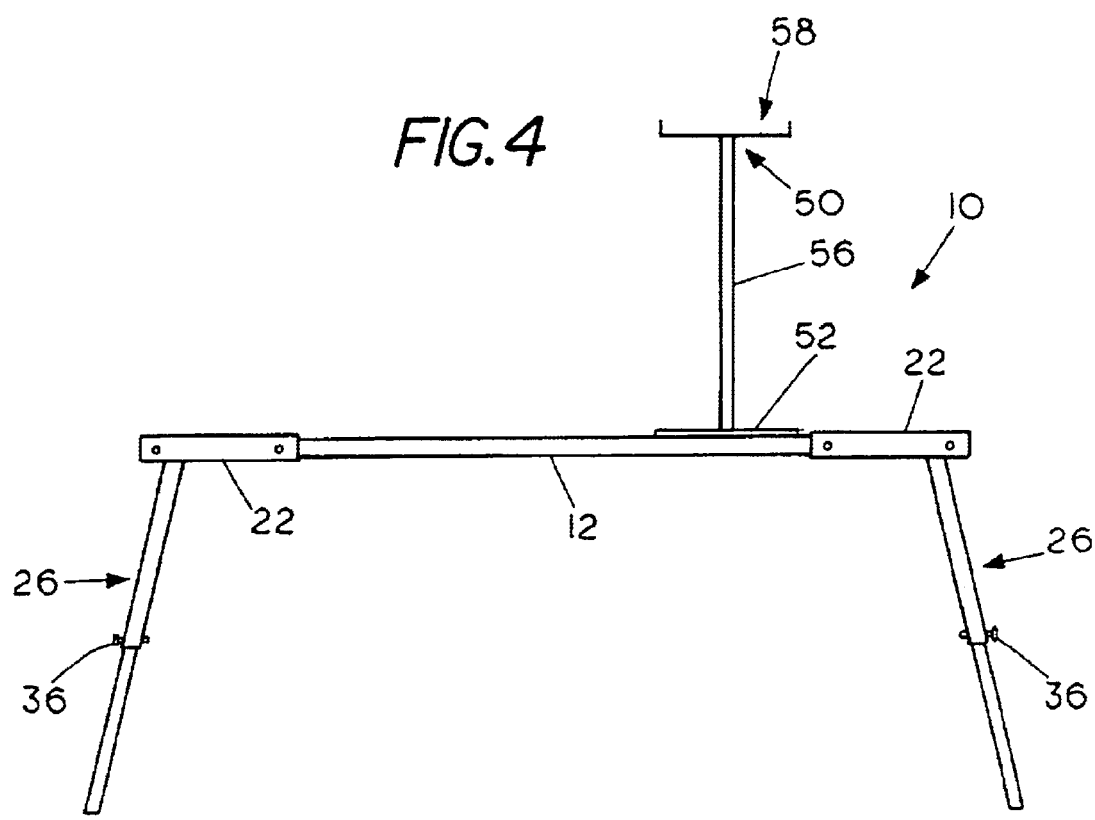
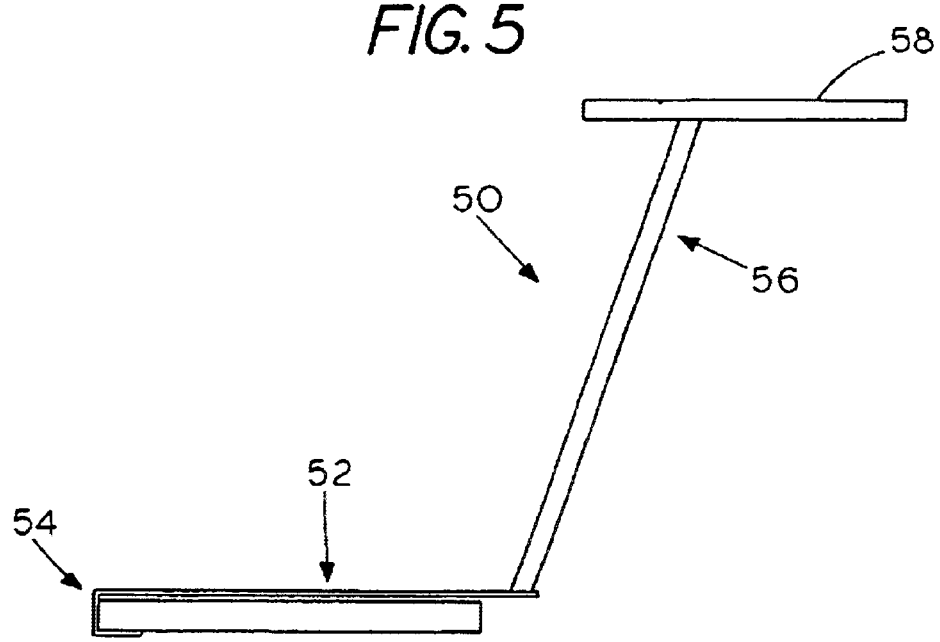

SCAFFOLD SYSTEM

BACKGROUND OF THE INVENTION

The invention relates to a portable work stand, and more particularly, to a portable work stand that may be site assembled using components to suit the task at hand.

Often, a worker, such as a carpenter, sheetrocker, painter, or the like will be working in the field and it becomes advantageous to have a portable work stand to support the tools or a small scaffold to support the user. In the past, the user has taken various items found on the site and attempted fabricate a usable work support from the found items. While this may function, it can be time consuming to collect the necessary items and fabricate the work stand. Additionally, the work stand is not portable and may even be dangerous. When the worker moves to another site, the process must be repeated.

Several portable work stands have been developed such as saw horses and portable scaffolds. Constructionists commonly need a work bench, which often is created again using existing material on the site. Such work benches lack support for the materials being cut. That is, the materials are not held level with the cutting surface on a chop saw or other such equipment. The scaffolds also lack a tray from which to hang or lay tools and small materials, requiring the construction worker to carry all such materials on their person.

What is needed is a portable scaffold system that converts between a scaffold, a work bench and a saw horse. Desirably, the scaffold system should provide support to materials when used as a work bench. Further, the scaffold system, when operated as a scaffold, should provide a tray for tools and materials. The material support and tray should be removable and slidable along the surface of the scaffold system, with the removability and slidability being a quick and easy process.

SUMMARY OF THE INVENTION

The present invention is a scaffold system, convertible between a scaffold, a work bench, and a saw horse, complete with a removable or slidable support for materials and a tray for tools and small materials. Described is a scaffold system adapted to be used with a plank. The system is provided with at least one end support which engages the plank. A moveable tray, including a plank attachment, a vertical support and an upper horizontal support, selectively secures to the plank. The vertical support interconnects the plank attachment and the upper horizontal support.

The system may include a material support bracket including a plank securement adjustably joined to a material support. The plank securement may have a stationary arm in slidable engagement with an adjustable arm designed to capture the plank therebetween. A spring may draw the adjustable arm toward the stationary arm to allow for easy attachment and removal. The material support may have a extenders joined to the stationary arm and a platform joined the extenders. The extenders may be used to adjust the height of the platform.

Advantageously, the present invention provides a collapsible design easy to set-up, take down and store.

Yet another advantage is that the present invention may be used as a work bench, a saw horse and a scaffold.

Still yet another advantage is that the system provides a tray properly positioned for a user standing on the scaffold with the tray behind the work, e.g., out of the way, but at easy access, and the tray is positioned to support tools and the like at hand level for the worker standing upright.

Still another advantage is that the scaffold is provided with a material support attachment to support materials in a level position such that the materials may be cut with a chop saw or the like.

These and other advantages will become apparent when reading the description below.

BRIEF DESCRIPTION OF THE DRAWINGS

FIG. 4 is a side view of an embodiment of the scaffold, showing the movable tray attached to the plank; and FIG. 5 is an end view showing the movable tray attached to the plank;

DETAILED DESCRIPTION

Figure 1:
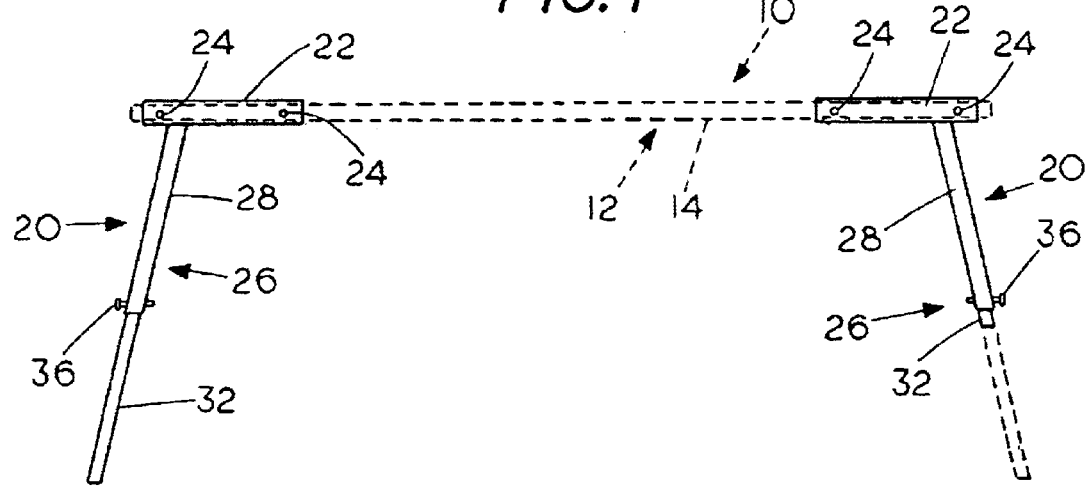
FIG. 1 is a side view of the scaffold of the present invention with the plank shown in phantom.

The scaffold system 10 of the present invention may be provided with a plank 12, at least one end support 20, a moveable tray 50, and a material support bracket 70. Such system is interchangeable between a work bench, a saw horse and a scaffold. Each component will be described in further detail with reference to the Figures provided herewith.

The plank 12 may be provided with the scaffold system 10, but preferably is provided by the user. The plank 12 may be any size suitable for supporting the weight, which will be placed thereon. However, the plank 12 is preferably a 2"×12" board between 2 and 10 feet in length. Size adjustments and type of material may be selected by one skilled in the art.

Figure 2:
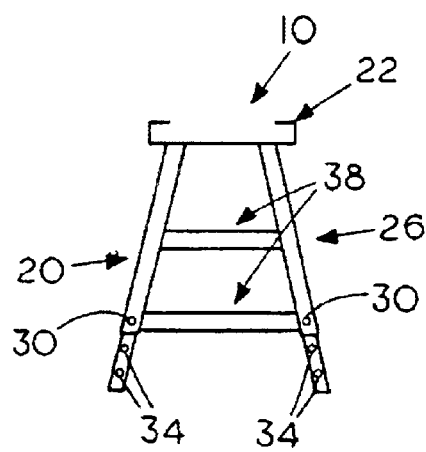
FIG. 2 is an end view of the end support.
Figure 3:
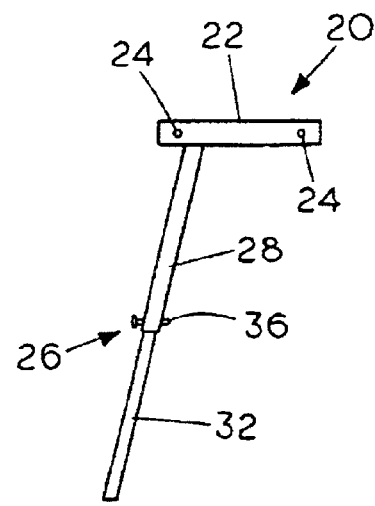
FIG. 3 is a side view of the end support.

At least one end support 20, as shown in FIGS. 2 and 3, may be provided with a plank bracket 22, legs 26 and cross bars 38. While its contemplated that normally the scaffold system 10 would have two end supports 20, one on each end of the plank 12, one end support 20 may be used if suitable stable support is provided on the other end. More than two end supports 20 may be used along the length of the plank 12 at various locations (not just at the end) if additional support is need under the plank 12.

The plank bracket 22 is designed to wrap around at least one edge 14 of the plank 12, see FIGS. 2 and 3. Plank fasteners 24 may pass through the plank bracket 22 and into the plank 12 for additional support. The plank bracket 22 may be permanently secured to the legs 26.

Each end support 20 may have legs 26. An upper section 28 of the leg 26 may define at least one aperture 30 and a lower section 32 may define at least one aperture 34. A plurality of apertures 30 or 34 are contemplated to be either on the upper section 28 or lower section 32. The upper section 28 desirably engages the lower section 32 in a telescoping manner as shown. An adjustment pin 36 is sized to be received in the apertures 30, 34, when aligned, to fix the upper section 28 relative to the lower section 32 of the legs 26 as shown in FIG. 3. The adjustment pin 36 may be removed to adjust the height to a different level, using the plurality of apertures 30 or 34 on either the upper section 28 or lower section 32.

The end support 20 may also have at least one cross bar 38 interconnecting the legs 26. More cross bars 38 and the orientation of the cross bars 38 provide stability of the scaffold system 10. The cross bars 38 join to the upper section 28 to provide a full range of movement of the lower section 32 relative to the upper section 28 and to allow for angular orientation of the legs 26 with respect to each other.

A moveable tray 50 preferably includes a plank attachment 52, a vertical support 56 and an upper horizontal support 58. The plank attachment 52 may have a hook end 54 adapted to releasably encase an edge 14 of the plank 12 and attaches to the vertical support 56 at the end of the plank attachment 52 opposite the hook end 54. The moveable tray 50 is adapted to be repositioned along the length of the plank 12. The vertical support 56 interconnects the plank attachment 52 and the upper horizontal support 58. The vertical support 56 preferably leans away from the hook end 54, which tightens the grip of the hook end 54 about the plank 12 and moves the upper horizontal support 58 out of the way, e.g. behind the user, when the user is standing upright on the plank 12 in a work position. The upper horizontal support 58, secured to the vertical support 56, may be in the form of a tray, bar or other device sized and shaped to hold or hang tools.

Figure 6:
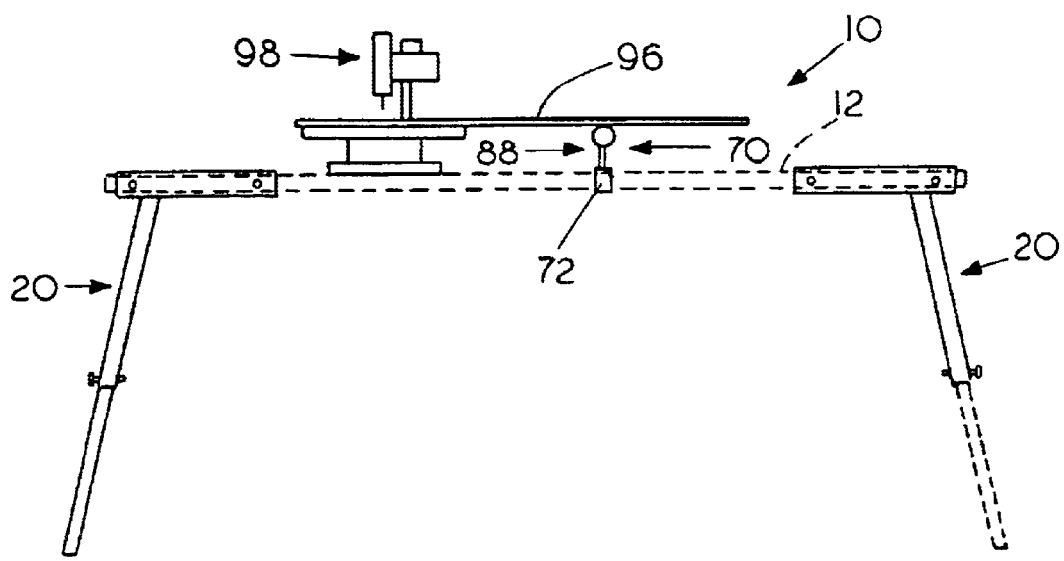
FIG. 6 is a side view of an embodiment of the present invention, showing the support bracket and showing the plank shown in phantom.
Figure 7:
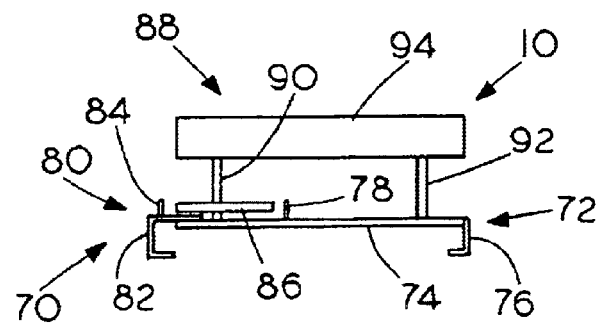
FIG. 7 is a side view of the support bracket.

A material support bracket 70, FIGS. 6 and 7, may include a plank securement 72 and a material support 88. The material support bracket 70 is designed to support lumber 96 or other material on the scaffold system 10, when the system 10 is being used as a workbench. The material support bracket 70 may be adjustable in height such that the lumber 96 remains level regardless of the height of the chop saw 98.

The plank securement 72 may be any structure suitable for joining, preferably slidably and/or releasably, the material support bracket 70 to a plank 12. The plank securement 72 preferably has a stationary arm 74 in slidable engagement with an adjustable arm 80. The stationary arm 74 desirably has a hook end 76 adapted to encase the edge 14 of the plank 12. A post 78 may project from the stationary arm 74. The adjustable arm 80 may also have a hook end 82 adapted to encase an edge 14 of the plank 12 and a post 84 extending therefrom. A spring 86 may be secured to the posts 78, 84 such that the spring 86 pulls the adjustable arm 80 toward the stationary arm 74. The material support 88 may have a first extender 90 and a second extender 92 joined to the stationary arm 74. Suitable extenders 90, 92 include threaded posts. A platform 94 may be joined to the first and second extenders 90,92. The first and second extenders 90, 92 are desirably adapted to adjust the height of the platform 94.

Although the present invention has been described with reference to preferred embodiments, workers skilled in the art will recognize changes may be made in form and detail without departing from the spirit and scope of the invention.

We claim:

1. A scaffold system, comprising:

a plank:

at least one end support having a plank bracket, the plank engaging the plank bracket, the end support having adjustable legs, and the end support having at least one cross bar interconnecting the legs;

a moveable tray including a plank attachment, a vertical support and an upper horizontal support, the vertical support interconnecting the plank attachment and the upper horizontal support, the plank attachment having a hook end adapted to encase an edge of the plank; and a material support bracket including a plank securement and a material support, the plank securement releasably and slidably joined to the plank, the material support adjustably joined to the prank securement.

2. A scaffold system, comprising:

a plank;

at least one end support engaging the plunk;

a moveable tray including a plank attachment, a vertical support and an upper horizontal support, the vertical support interconnecting the plank attachment and the upper horizontal support; and a material support bracket joined to the plank, the material support bracket including a plank securement joined to a material support, the plank securement having a stationary arm in slidable engagement with an adjustable arm, and the stationary arm being joined to the adjustable arm with a spring, the spring adapted to draw the adjustable arm toward the stationary arm.

3. The device of claim 2 further including a plank bracket with plank fasteners, the plank fasteners joining the plank to the plank bracket.

4. The device of claim 2 wherein the end support has legs.

5. The device of claim 4 wherein the legs are adjustable in height.

6. The device of claim 2 wherein the tray is adapted to be positioned behind a user standing on the plank in a work position.

7. The device of claim 2 wherein the tray is adapted to be at a height of a user's hand while standing upright on the plank.

8. The device of claim 2 wherein the plank attachment has a hook end adapted to encase an edge of the plank.

9. The device of claim 2 wherein the stationary arm has a hook end adapted to encase an edge of the plank and the adjustable arm has a hook end adapted to encase an edge of the plank.

10. The device of claim 9 further including:

a post joined to the stationary arm; and a post joined to the adjustable arm, the spring secured to the post of the stationary arm and secured to the post on the adjustable arm.

11. The device of claim 2 wherein the material support has:

a first extender joined to the stationary arm, a second extender joined to the stationary arm; and a platform joined the first and second extenders, the first and second extenders adapted to adjust the height of the platform.

* * * * *